(12) United States Patent
Kim et al.

(10) Patent No.: US 7,391,790 B2
(45) Date of Patent: Jun. 24, 2008

(54) CARDBUS PC CARD TYPE WIRELESS TRANSMITTING/RECEIVING DEVICE

(75) Inventors: Jong Won Kim, Taejon (KR); Sangsung Choi, Taejon (KR); Kwang Rob Park, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 689 days.

(21) Appl. No.: 11/015,817

(22) Filed: Dec. 20, 2004

(65) Prior Publication Data

US 2006/0095615 A1 May 4, 2006

(30) Foreign Application Priority Data

Nov. 3, 2004 (KR) ...................... 10-2004-0088826

(51) Int. Cl.
*H04J 3/16* (2006.01)
*H04J 3/22* (2006.01)

(52) U.S. Cl. ..................................... 370/466
(58) Field of Classification Search ................ 370/464, 370/465, 466, 467; 709/230, 236
See application file for complete search history.

(56) References Cited

U.S. PATENT DOCUMENTS

| 6,497,656 | B1 * | 12/2002 | Evans et al. | 600/300 |
|---|---|---|---|---|
| 6,771,933 | B1 * | 8/2004 | Eng et al. | 455/41.2 |
| 7,046,691 | B1 * | 5/2006 | Kadyk et al. | 370/466 |
| 7,305,511 | B2 * | 12/2007 | Barrett et al. | 710/316 |
| 2003/0081630 | A1 | 5/2003 | Mowery et al. | |
| 2005/0037751 | A1 * | 2/2005 | Kim et al. | 455/432.1 |
| 2007/0076816 | A1 * | 4/2007 | Hoffmann et al. | 375/298 |

FOREIGN PATENT DOCUMENTS

| KR | 2002-64271 | 8/2002 |
|---|---|---|
| WO | WO 02/33902 | 5/2002 |

* cited by examiner

*Primary Examiner*—Ajit G Patel
(74) *Attorney, Agent, or Firm*—Lowe Hauptman Ham & Berner LLP

(57) ABSTRACT

A CardBus PC Card type wireless transmitting/receiving device performs a wireless data transmission/reception operation between a plurality of notebook PCs and an MB-OFDM (Multiband Orthogonal Frequency Division Multiplexing) UWB (Ultra Wide Band) type piconet coordinator. The device includes a wireless 1394 device, built in the notebook PC in the form of a CardBus PC Card, for converting a CardBus PC Card access signal of the notebook PC into an MB-OFDM UWB signal to transmit the converted MB-OFDM UWB signal, and inversely converting a received MB-OFDM UWB signal into a CardBus PC Card access signal of the notebook PC. The device can easily be built in a notebook PC, has a simple structure with a low cost, has a very high wireless transmission speed of 55 to 480 Mbps in comparison to the existing IEEE 802.11b type wireless 1394 bridge device in the form of an external IEEE 1394 adapter, and guarantees the QoS (Quality of Service) using the IEEE802.15.3 type MAC to provide a high-quality service to users.

17 Claims, 8 Drawing Sheets

CARDBUS PC CARD TYPE WIRELESS TRANSMITTING/RECEIVING DEVICE

BACKGROUND OF THE INVENTION

1. Field of the Invention

The present invention relates to a CardBus PC Card type wireless transmitting/receiving device, and more particularly, to a CardBus PC Card type wireless transmitting/receiving device which is built in a notebook PC in the home or office, and converts data of the notebook PC into an MB-OFDM (Multiband Orthogonal Frequency Division Multiplexing) UWB (Ultra Wide Band) signal, of which the quality of service (QoS) is guaranteed, to transmit by wireless the MB-OFDM UWB signal at a transmission speed of 55 to 480 Mbps in the band of 3.1 to 10.6 GHz, or inversely converts the MB-OFDM UWB signal into the data of the notebook PC.

2. Background of the Related Art

As is well known, a conventional wireless transmitting/receiving device developed for a notebook PC is the IEEE802.11b type wireless 1394 bridge device in the form of an external IEEE1394 adaptor. However, the conventional IEEE802.11b type wireless 1394 bridge device in the form of the external IEEE1394 adaptor has the problem that it is difficult for a user to purchase and install the IEEE802.11b type wireless 1394 bridge device. Also, because the IEEE802.1 b type wireless 1394 bridge device has a built-in IEEE 394 chip, its structure is complicated to cause a high manufacturing cost.

Additionally, the conventional IEEE802.11b type wireless 1394 bridge device in the form of the external IEEE1394 adaptor has a fatal drawback in that audio/video data cannot be transmitted in real time because it has a very low wireless transmission speed of 11 Mbps at maximum and it is difficult to guarantee the QoS.

SUMMARY OF THE INVENTION

Accordingly, the present invention is directed to a CardBus PC Card type wireless transmitting/receiving device that substantially obviates one or more problems due to limitations and disadvantages of the related art.

It is an object of the present invention to provide a CardBus PC Card type wireless transmitting/receiving device which can transmit real-time audio/video data in addition to non-real-time data with the advantages that it can easily be built in a notebook PC, has a simple structure with a low cost, has a very high wireless transmission speed of 55 to 480 Mbps using an MB-OFDM UWB transmitter/receiver, and guarantees a QoS using an IEEE802.15.3 type MAC (Medium Access Control).

Additional advantages, objects, and features of the present invention will be set forth in part in the description which follows and in part will become apparent to those having ordinary skill in the art upon examination of the following or may be learned from practice of the present invention. The objectives and other advantages of the present invention may be realized and attained by the structure particularly pointed out in the written description and claims hereof as well as the appended drawings.

In order to achieve the above and other objects, there is provided a CardBus PC Card type wireless transmitting/receiving device that performs a wireless data transmission/reception operation between a plurality of notebook PCs and an MB-OFDM (Multiband Orthogonal Frequency Division Multiplexing) UWB (Ultra Wide Band) type piconet coordinator, the device comprising a wireless 1394 device, built in the notebook PC in the form of a CardBus PC Card, for converting a CardBus PC Card access signal of the notebook PC into an MB-OFDM UWB signal to transmit the converted MB-OFDM UWB signal, and inversely converting a received MB-OFDM UWB signal into a CardBus PC Card access signal of the notebook PC.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENT

The preferred embodiment of the present invention will now be explained in detail with reference to the accompanying drawings.

Figure 1:
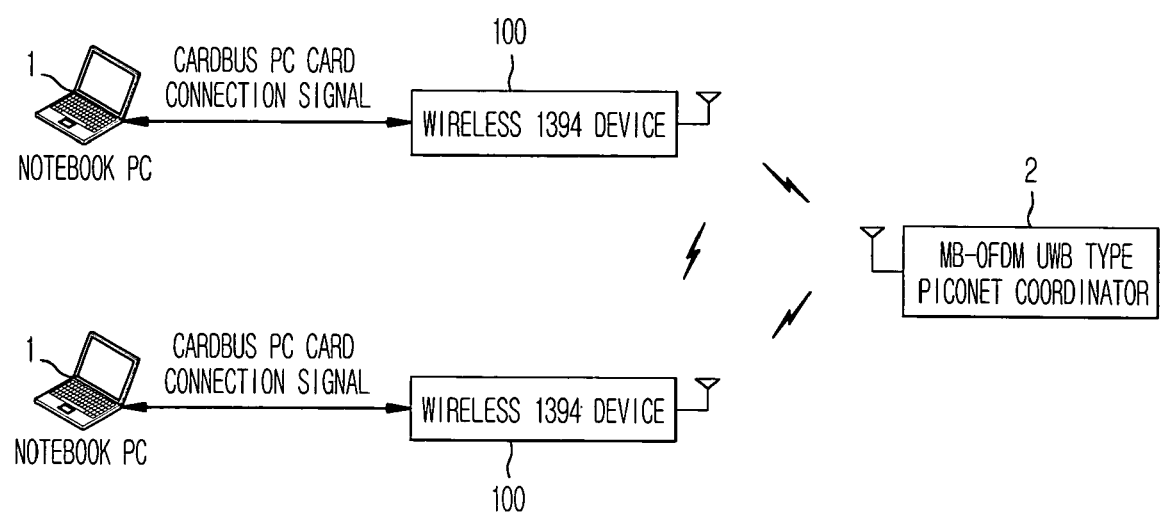
FIG. 1 is a view illustrating a network construction to which a CardBus PC Card type wireless transmitting/receiving device according to the present invention is applied.

FIG. 1 is a view illustrating a network construction to which a CardBus PC Card type wireless transmitting/receiving device according to the present invention is applied.

Figure 3:
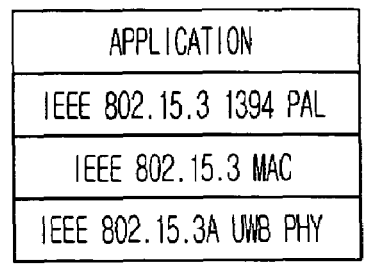
FIG. 3 is a view illustrating a protocol stack of the wireless 1394 device of FIG. 2.

Referring to FIG. 1, a wireless 1394 device 100 is built in a notebook PC 1 in the form of a CardBus PC Card. The wireless 1394 device 100 converts a CardBus PC Card access signal of the notebook PC 1 into an MB-OFDM (Multiband Orthogonal Frequency Division Multiplexing) UWB (Ultra Wide Band) signal of which the quality of service (QoS) is guaranteed and which provides a transmission speed of 55 to 480 Mbps in the band of 3.1 to 10.6 GHz, or inversely converts the MB-OFDM UWB signal into the CardBus PC Card access signal of the notebook PC 1. Additionally, the wireless 1394 device 100 performs the conversion of an application service into an MB-OFDM UWB signal and the inverse conversion of the MB-OFDM UWB signal into the application service by performing a protocol stack of FIG. 3 that includes an IEEE 802.15.3 1394 PAL protocol, an IEEE 802.15.3 MAC protocol and an IEEE 802.15.3a UWB PHY protocol by software.

Figure 7:
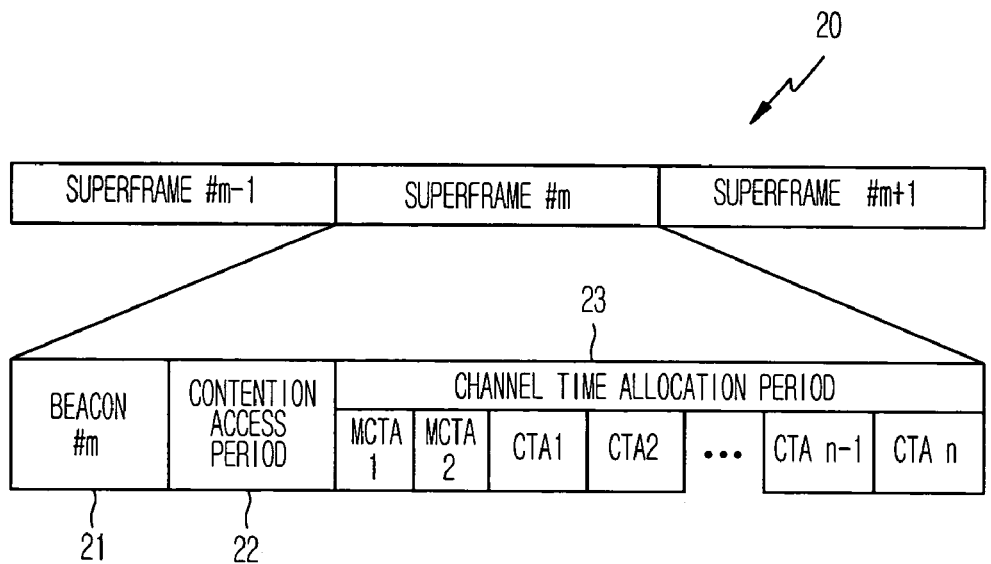
FIG. 7 is a view illustrating the structure of an IEEE 802.15.3 piconet superframe in the wireless 1394 device of FIG. 2.

Meanwhile, an MB-OFDM UWB type piconet coordinator 2 serves as a coordinator and a scheduler of an MB-OFDM UWB WPAN (Wireless Personal Area Network), and provides a basic network synchronization time to the CardBus PC Card type wireless 1394 devices 100 or other MB-OFDM UWB devices by creating an IEEE 802.15.3 piconet superframe as illustrated in FIG. 7. Additionally, the MB-OFDM UWB type piconet coordinator 2 performs functions of connection setting, network resource allocation on a piconet and power save mode management based on a preset QoS policy and a CT (Channel Time) resources for a data transmission. Here, the IEEE 802.15.3 piconet superframe 20 has the structure composed of a beacon 21, a contention access period 22 and a channel time allocation period 23.

Figure 2:
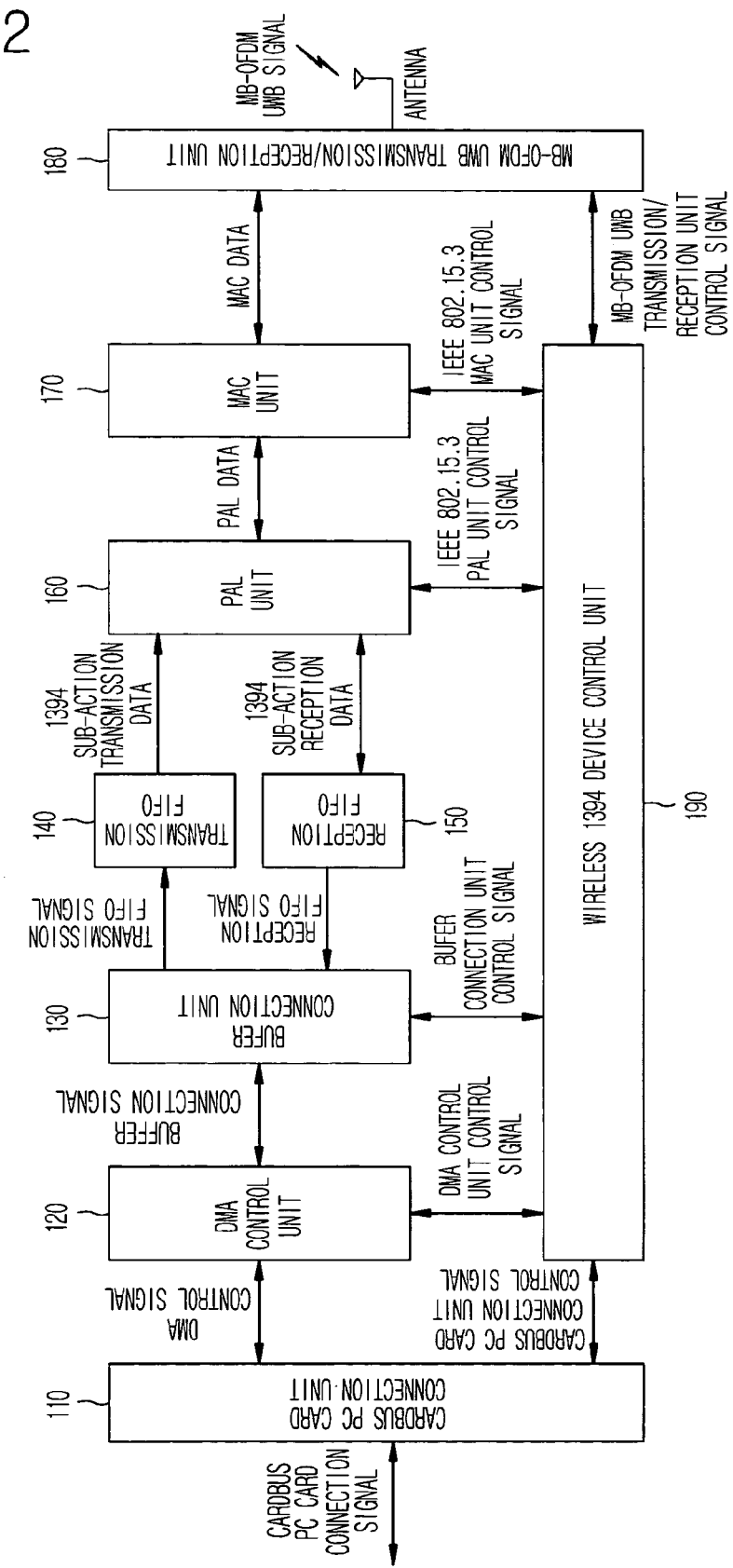
FIG. 2 is a block diagram illustrating the internal construction of a wireless 1394 device in a CardBus PC Card type wireless transmitting/receiving device according to an embodiment of the present invention.

Now, the operation of the wireless 1394 device 100 will be explained in more detail with reference to FIG. 2.

A CardBus PC Card connection unit 110 is connected to the notebook PC 1 through a CardBus PC Card interface, and transmits/receives the CardBus PC Card access signal. The CardBus PC Card access signal is composed of a multiplexed CardBus PC Card address, data, a CardBus PC Card control signal and a CardBus PC Card status signal. The multiplexed CardBus PC Card address and the data are converted into a DMA (Direct Memory Access) control signal to be transferred to a DMA control unit 120, and the CardBus PC Card control signal and the CardBus PC Card status signal are converted into a PC Card connection unit control signal to be transferred to a CardBus PC Card type wireless 1394 device control unit 190.

The DMA control unit 120 receives the DMA control signal from the CardBus PC Card connection unit 110, and transfers non-real-time data in a host memory of the notebook PC 1 and real-time audio/video data to a buffer connection unit 130. Additionally, the DMA control unit 120 receives a buffer connection signal from the buffer connection unit 130, and transfers non-real-time data in a reception FIFO (First-In First-Out) 150 and the real-time audio/video data to the CardBus PC Card connection unit 110.

Meanwhile, the buffer connection unit 130 receives the buffer connection signal from the DMA control unit 120, converts the buffer connection signal into a transmission FIFO signal, and transfers the transmission FIFO signal to a transmission FIFO unit 140. Additionally, the buffer connection unit 130 receives a reception FIFO signal from a reception FIFO unit 150, converts the reception FIFO signal into a buffer connection signal, and transfers the buffer connection signal to the DMA control unit 120.

The transmission FIFO unit 140 receives the transmission FIFO signal from the buffer connection unit 130, temporarily stores and convert the non-real-time data of the notebook PC 1 and the real-time audio/vide data into 1394 sub-action transmission data, and transfers the 1394 sub-action transmission data to a PAL unit 160. The reception FIFO unit 150 receives and temporarily stores the 1394 sub-action reception data from the PAL unit 160, converts the 1394 sub-action reception data into a reception FIFO signal, and transfers the reception FIFO signal to the buffer connection unit 130.

Meanwhile, the PAL unit 160 receives the 1394 sub-action transmission data from the transmission FIFO unit 140, receives a protocol ID and a PAL header corresponding to an IEEE 802.15.3 PAL unit control signal from the wireless 1394 device control unit 190, and performs an encapsulation of the 1394 sub-action transmission data to produce PAL data in the form of an IEEE 802.15.3 MSDU (MAC Service Data Unit) frame to transfer the PAL data to a MAC unit 170. Additionally, the PAL unit 160 receives and performs a decapsulation of the PAL data in the form of the IEEE 802.15.3 MSDU frame of FIG. 8 from the MAC unit 170 to produce the 1304 sub-action reception data, the protocol ID and the PAL header, transfers the 1394 sub-action reception data to the reception FIFO unit 150, and transfers the protocol ID and the PAL header corresponding to the IEEE 802.15.3 PAL unit control signal to the CardBus PC Card type wireless 1394 device control unit 190. Here, the IEEE 802.15.3 MSDU frame 10 is composed of a protocol ID field 11 in which protocol ID information is stored, a PAL header field 12 in which PAL header information is stored and a 1394 sub-action data field 13 in which 1394 sub-action data is stored.

Figure 8:
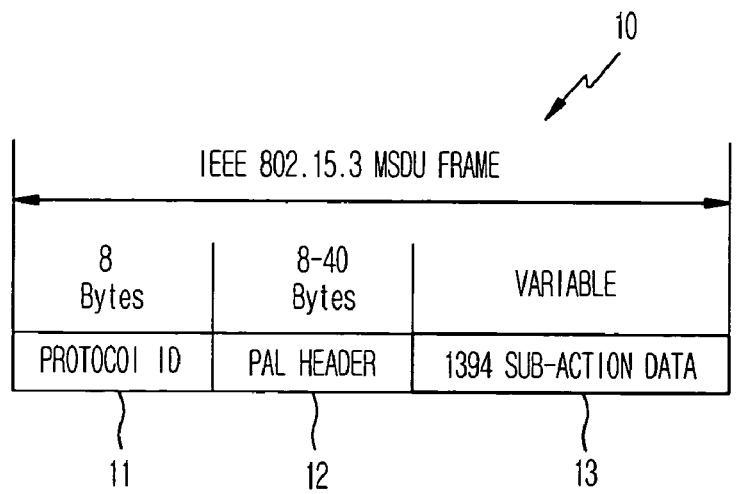
FIG. 8 is a view illustrating the structure of an IEEE 802.15.3 MSDU frame in the wireless 1394 device of FIG. 2.
Figure 9:
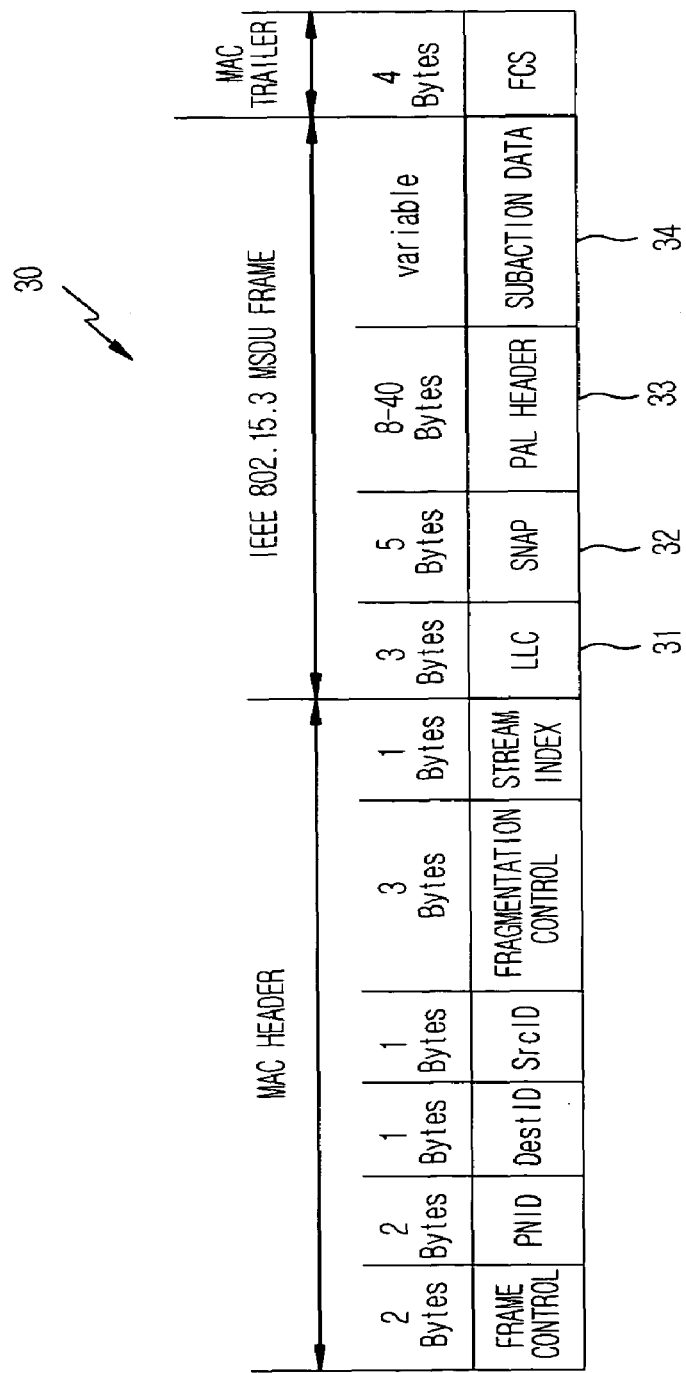
FIG. 9 is a view illustrating the structure of an IEEE 802.15.3 MPDU frame in the wireless 1394 device of FIG. 2.

The MAC unit 170 receives the PAL data in the form of the IEEE 802.15.3 MSDU frame of FIG. 8 from the PAL unit 160, receives an IEEE 802.15.3 MAC unit control signal from the CardBus PC Card type wireless 1394 device control unit 190, and converts the PAL data and the IEEE 802.15.3 MAC unit control signal into MAC data in the form of an IEEE 802.15.3 MPDU (MAC Protocol Data Unit) frame of FIG. 9. Additionally, the MAC unit 170 receives the MAC data in the form of the IEEE 802.15.3 MPDU frame of FIG. 9 from the MB-OFDM UWB transmission/reception unit 180, inversely converts the MAC data into the PAL data in the form of the IEEE 802.15.3 MSDU frame of FIG. 8, and transfers the PAL data to the IEEE 802.15.3 PAL unit 160. Additionally, the MAC unit 170 transmits command data and non-real-time data by a CSMA/CA (Carrier Sense Multiple Access with Collision Avoidance) method in a selective CAP (Contention Access Period) of the IEEE 802.15.3 piconet superframe of FIG. 7 so that various CardBus PC Card type wireless 1394 devices can share a single wireless channel, and transmits management data, command data, non-real-time data and real-time audio/video data that supports the QoS by a TDMA (Time Division Multiple Access) method in a basic CTAP (Channel Time Allocation Period). Here, the IEEE 802.15.3 MPDU frame has the structure composed of an LLC field 31, a SNAP field 32, a PAL header field 33 and a sub-action data field 34.

Meanwhile, the MB-OFDM UWB transmission/reception unit 180 receives MAC data in the form of an IEEE 802.15.3 MPDU frame of FIG. 9 from the MAC unit 170, receives an MB-OFDM UWB transmission/reception unit control signal from the CardBus PC Card type wireless 1394 device control unit 190, and converts the MB-OFDM UWB transmission/reception unit control signal into an MB-OFDM UWB signal that provides the transmission speed of 55 to 480 Mbps in the band of 3.1 to 10.6 GHz to transfer the converted MB-OFDM UWB signal to an antenna. Additionally, the MB-OFDM UWB transmission/reception unit 180 receives the MB-OFDM UWB signal that provides the transmission speed of 55 to 480 Mbps in the band of 3.1 to 10.6 GHz from another CardBus PC Card type wireless 1394 device 100 through the antenna, inversely converts the MB-OFDM UWB signal into the MAC data in the form of the IEEE 802.15.3 MPDU frame of FIG. 9, and transfers the MAC data to the MAC unit 170. The antenna functions to transmit/receive the MB-OFDM UWB signal in the band of 3.1 to 10.6 GHz.

The wireless 1394 device control unit 190 controls and manages the CardBus PC Card connection unit 110 using a CardBus PC Card connection unit control signal, controls and manages the DMA control unit 120 using a DMA control unit control signal, and controls and manages the buffer connection unit 130 using a buffer connection unit control signal. Additionally, the wireless 1394 device control unit 190 controls and manages the PAL unit 160 using an IEEE 802.15.3 PAL unit control signal, controls and manages the MAC unit 170 using an IEEE 802.15.3 MAC control signal, and controls and manages the MB-OFDM UWB transmission/reception unit 180 using an MB-OFDM UWB transmission/reception unit control signal.

Now, the operation of the PAL unit 160 will be explained in more detail with reference to FIG. 4.

Figure 4:
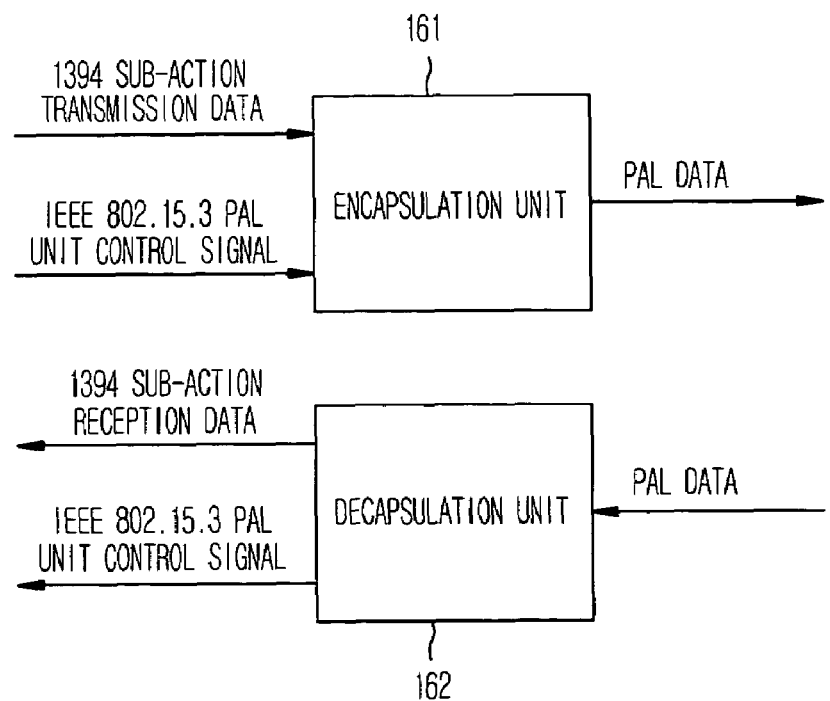
FIG. 4 is a block diagram illustrating the internal construction of a PAL unit in the wireless 1394 device of FIG. 2.

Referring to FIG. 4, an encapsulation unit 161 receives 1394 sub-action transmission data from the transmission FIFO unit 140, and receives a protocol ID and a PAL header corresponding to the IEEE 802.15.3 PAL unit control signal from the wireless 1394 device control unit 190. Additionally, the encapsulation unit 160 performs an encapsulation of the 1394 sub-action transmission data to produce PAL data in the form of an IEEE 802.15.3 MSDU frame to transfer the PAL data to the MAC unit 170, performs cycle time distribution and synchronization functions so as to support the IEEE 1394 application service, and performs a search for devices and services. Additionally, the encapsulation unit 160 performs a real-time resource allocation function and a real-time connection management function.

A decapsulation unit 162 of the PAL unit 160 receives and performs a decapsulation of the PAL data in the form of the IEEE 802.15.3 MSDU frame illustrated in FIG. 8 from the MAC unit 170 to produce the 1304 sub-action reception data, the protocol ID and the PAL header, transfers the 1394 sub-action reception data to the reception FIFO unit 150, and transfers the protocol ID and the PAL header corresponding to the IEEE 802.15.3 PAL unit control signal to the wireless 1394 device control unit 190.

Figure 5:
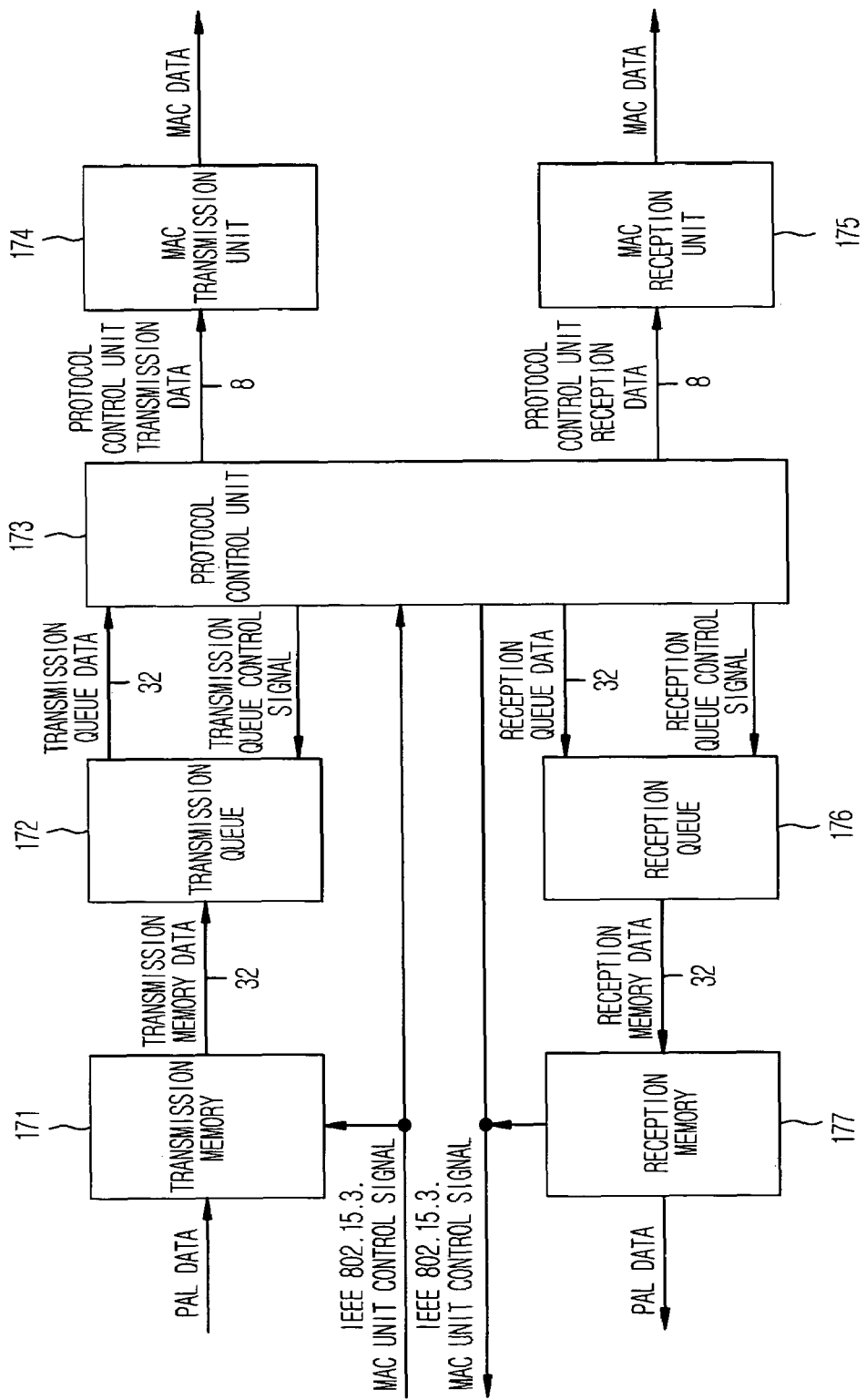
FIG. 5 is a block diagram illustrating the internal construction of a MAC unit in the wireless 1394 device of FIG. 2.

Meanwhile, the operation of the MAC unit 170 will be explained in more detail with reference to FIG. 5.

A transmission memory 171 receives and temporarily stores the PAL data in the form of the IEEE 802.15.3 MSDU frame from the PAL unit 160 and the MAC header corresponding to the IEEE 802.15.3 MAC unit control signal from the wireless 1394 device control unit 190, combines the MAC header with the IEEE 802.15.3 MSDU frame, and converts the combined data into transmission memory data in the unit of 32 bits to transfer the transmission memory data to a transmission queue 172.

The transmission queue 172 receives and temporarily stores the transmission memory data in the unit of 32 bits from the transmission memory 171, converts the transmission memory data into transmission queue data in the unit of 32 bits according to a transmission queue control signal from a protocol control unit 173, and transfers the transmission queue data to the protocol control unit 173.

The protocol control unit 173 receives and converts non-real-time data corresponding to the transmission queue data in the unit of 32 bits and real-time audio/video data that supports the QoS output from the transmission queue 172 into protocol control unit transmission data in the unit of 8 bits, and transfers the protocol control unit transmission data to a MAC transmission unit 174. Additionally, the protocol control unit 173 receives and converts management data corresponding to the IEEE 802.15.3 MAC unit control signal and command data into the protocol control unit transmission data in the unit of 8 bits, and transfers the protocol control unit transmission data to the MAC transmission unit 174.

Additionally, the protocol control unit 173 transmits the command data and the non-real-time data by the CSMA/CA method in the selective CAP of the IEEE 802.15.3 piconet superframe illustrated in FIG. 7 so that various CardBus PC Card type wireless 1394 devices can share a single wireless channel, and transmits the management data, the command data, the non-real-time data and the real-time audio/video data that supports the QoS by the TDMA method in the basic CTAP (Channel Time Allocation Period). Additionally, the protocol control unit 173 receives the protocol control unit reception data in the unit of 8 bits from the MAC reception unit 175, and converts the non-real-time data and the real-time audio/video data into a reception queue data in the unit of 32 bits, and transfers the reception queue data to a reception queue 176 along with a reception queue control signal. Additionally, the protocol control unit 173 converts the management data and the command data into the IEEE 802.15.3 MAC unit control signal, transfers the IEEE 802.15.3 MAC control signal to the CardBus PC Card type wireless 1394 device control unit 30, and performs a piconet synchronization function with other MB-OFDM UWB devices.

Meanwhile, the MAC transmission unit 174 receives the protocol control unit transmission data in the unit of 8 bits from the protocol control unit 173, creates a MAC trailer of 4-byte FCS (Frame Check Sequence), and converts the MAC trailer into MAC data in the form of an IEEE 802.15.3 MPDU frame to transfer the MAC data to the MB-OFDM UWB transmission/reception unit 180.

A MAC reception unit 175 receives the MAC data in the form of the IEEE 802.15.3 MPDU frame of FIG. 9 from the MB-OFDM UWB transmission/reception unit 180, performs functions of frame address discrimination, duplicated frame detection, and FCS check, and converts the MAC data into protocol control unit reception data in the unit of 8 bits by removing the MAC trailer to transfer the protocol control unit reception data to the protocol control unit 173.

The reception queue 176 receives and temporarily stores reception queue data in the unit of 32 bits from the protocol control unit 173, converts the reception queue data into reception memory data in the unit of 32 bits according to the reception queue control signal from the protocol control unit 173, and transfers the reception memory data to a reception memory 177.

The reception memory 177 receives and temporarily stores the reception memory data in the unit of 32 bits from the reception queue 176, and then performs a separation of the reception memory data into an IEEE 802.15.3 MSDU frame and a MAC header. Additionally, the reception memory 177 converts the IEEE 802.15.3 MSDU frame into the PAL data in the form of the IEEE 802.15.3 MSDU frame to transfer the PAL data to the PAL unit 160, and transfers the MAC header corresponding to the IEEE 802. 15.3 MAC unit control signal to the wireless 1394 device control unit 190.

Meanwhile, the MB-OFDM UWB transmission/reception unit 180 includes an MB-OFDM UWB transmission unit 181 and an MB-OFDM UWB reception unit 182. The operation of the MB-OFDM UWB transmission/reception unit 180 will be explained with reference to FIG. 6.

Figure 10:
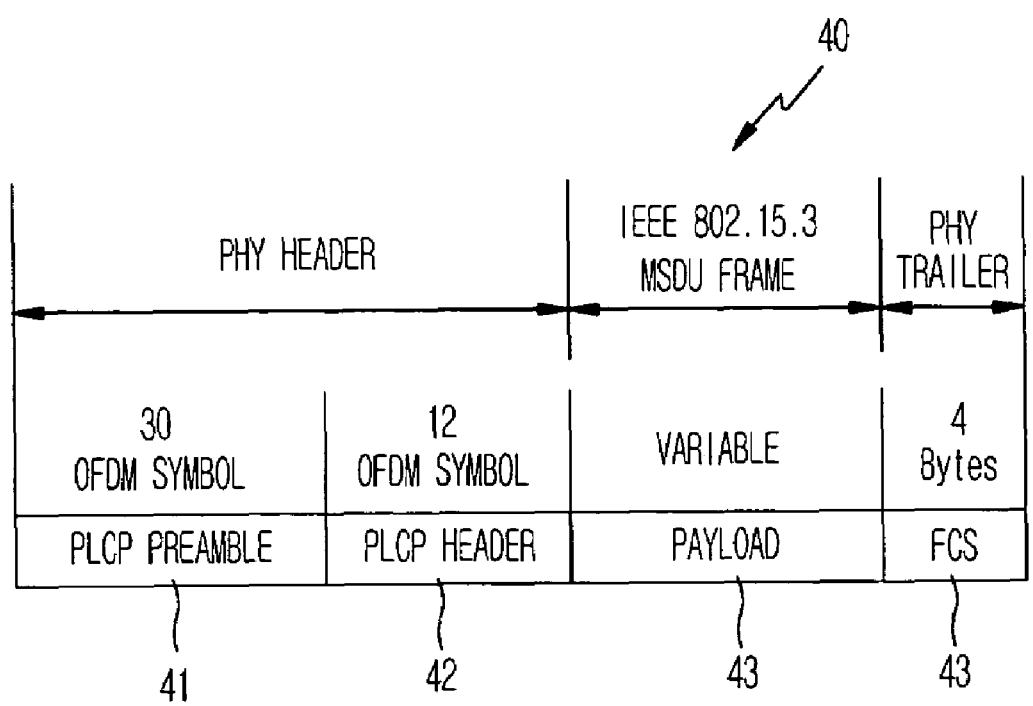
FIG. 10 is a view illustrating the structure of an IEEE 802.15.3 MB-OFDM UWB PPDU frame in the wireless 1394 device of FIG. 2.

In the MB-OFDM UWB transmission unit 181, a PLCP (Physical Layer Convergence Procedure) processor 181*a* receives the MAC data in the form of the IEEE 802.15.3 MPDU frame of FIG. 9 from the MAC unit 170 and the MB-OFDM UWB transmission/reception unit control signal from the wireless 1394 device control unit 190, converts the received data into PLCP-processed data in the form of an MB-OFDM UWB PPDU (PHY Protocol Data Unit) frame of FIG. 10, and transfers the PLCP-processed data to a scrambler 181*b*. Here, the MB-OFDM UWB PPDU frame 40 the structure composed of a PHY header field 41, an IEEE 802.15.3 MPDU frame field 42 and a PHY trailer field 43.

The scrambler 181b receives the PLCP-processed data from the PLCP processor 181a, performs a conversion of the PLCP-processed data into a random code sequence, and transfer the scrambled data to a convolutional encoder 181c.

The convolutional encoder 181 receives the scrambled data from the scrambler 182a, performs an convolutional encoding of the data, and transfers the convolutionally encoded data to a puncturer 181d.

The puncturer 181d receives the convolutionally encoded data from the convolutional encoder 181c and transmission speed data corresponding to the MB-OFDM UWB transmission/reception unit control signal from the CardBus PC Card type wireless 1394 device control unit 190, performs a puncturing function for heightening the code rate by regularly omitting a part of the convolutionally encoded data to match the transmission speed, and transfers punctured data to an interleaver 181e.

The interleaver 181e receives the punctured data from the puncturer 181d, performs a bit-interleaving function for rearranging the order of symbol columns and data columns in a predetermined unit so as to normally correcting burst errors produced due to instantaneous noises, and transfers the interleaved data to a modulator 181f.

The modulator 181f receives the interleaved data from the interleaver 181e, performs a QPSK (Quadrature Phase Shift Keying) modulation of the interleaved data, and transfers the modulated data to a serial-parallel conversion unit 181g.

The serial-parallel conversion unit 181g receives and converts the serial modulated data from the modulator 181f into parallel data, and transfers the parallel data to an IFFT (Inverse Fast Fourier Transform) unit 181h.

The IFFT unit 181h receives and performs an IFFT of the parallel data from the serial-parallel conversion unit 181g, and transfers the IFFT-transformed data to a DAC (Digital-Analog Conversion) unit 181i.

The DAC unit 181i receives and converts the IFFT-transformed data from the IFFT unit 181h into an analog signal, and transfers the analog signal to an RF (Radio Frequency) transmission unit 181j.

The RF transmission unit 181j receives and performs an RF modulation of the analog signal from the DAC unit 181i, converts the modulated signal into an MB-OFDM UWB signal to transfer the MB-OFDM UWB signal to the antenna.

Figure 6:
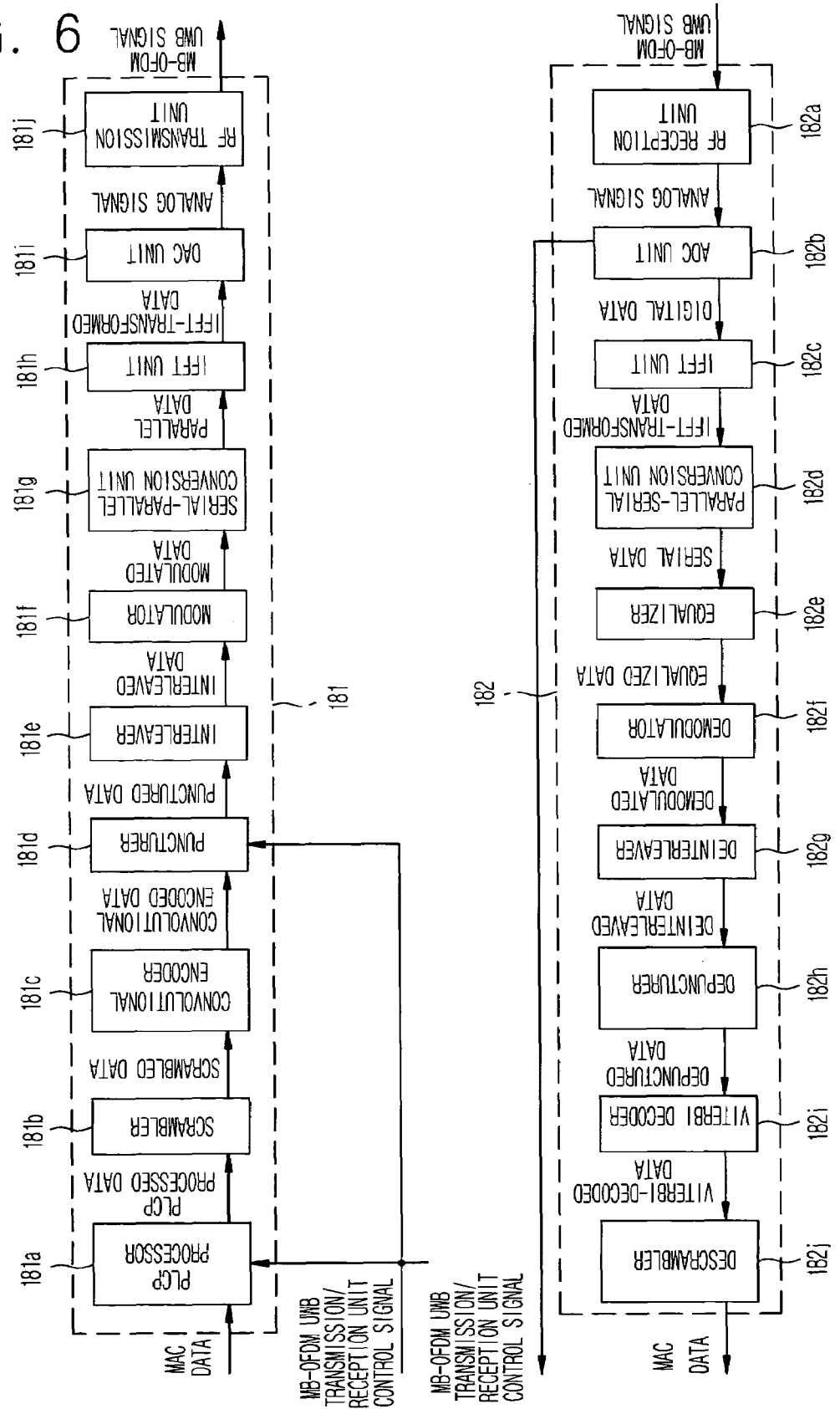
FIG. 6 is a block diagram illustrating the internal construction of an MB-OFDM UWB transmission/reception unit in the wireless 1394 device of FIG. 2.

Now, the operation of the MB-OFDM UWB reception unit 182 will be explained with reference to FIG. 6.

If an RF reception unit 182a receives the MB-OFDM UWB signal that provides the transmission speed of 55 to 480 Mbps in the band of 3.1 to 10.6 GHz from another CardBus PC Card type wireless 1394 device through the antenna, RF-modulates the MB-OFDM UWB signal into a baseband analog signal, and transfers the baseband analog signal to an ADC (Analog-Digital Conversion) unit 182b.

The ADC unit 182b receives and converts the analog signal from the RF reception unit 182a into digital data to transfer the digital data to an FFT (Fast Fourier Transform) unit 182c, and converts RSSI (Received Signal Strength Indicator) data into an MB-OFDM UWB transmission/reception unit control signal to transfer the MB-OFDM UWB transmission/reception unit control signal to the wireless 1394 device control unit 190.

Meanwhile, the FFT unit 182c receives and performs an FFT transform of the digital data from the ADC unit 182b, and transfers the FFT-transformed data to a parallel-serial conversion unit 182d.

The parallel-serial conversion unit 182d receives and converts the parallel FFT-transformed data from the FFT unit 182c into serial data, and transfers the serial data to an equalizer 182e.

The equalizer 182e receives the serial data from the parallel-serial conversion unit 182d, performs an equalization of the data in order to compensate for a signal distortion due to a transmission channel, and transfers the equalized data to a demodulator 182f.

The demodulator 182f receives and performs a QPSK demodulation of the equalized data from the equalizer 182e, and transfers the demodulated data to a deinterleaver 182g.

The deinterleaver 182g receives and performs a bit-deinterleaving of the demodulated data to normally correct the burst errors, and transfers the deinterleaved data to a depuncturer 182h.

Meanwhile, the depuncturer 182h receives and depunctures the deinterleaved data from the deinterleaver 182g in order to restore the part of the data regularly omitted by the puncturer, and transfers the depunctured data to a viterbi decoder 182i.

The viterbi decoder 182i receives and viterbi-decodes the depunctured data from the depuncturer 182h, and transfers the viterbi-decoded data to a descrambler 182j.

The descrambler 182j receives and descrambles the viterbi-decoded data from the viterbi decoder 182i in order to create the original data from the random code sequence made by the scrambler, and converts the descrambled data into MAC data in the form of the IEEE 802.15.3 MPDU frame to transfer the MAC data to the MAC unit 170.

As described above, the CardBus PC Card type wireless transmitting/receiving device according to the present invention has the prominent effects in that it is built in a notebook PC in the home or office, and converts data of the notebook PC into an MB-OFDM UWB signal, of which the quality of service (QoS) is guaranteed, to transmit by wireless the MB-OFDM UWB signal at a transmission speed of 55 to 480 Mbps in the band of 3.1 to 10.6 GHz, or inversely converts the MB-OFDM UWB signal into the data of the notebook PC, so that a ultrahigh-speed wireless MB-OFDM UWB network can be constructed, and not only non-real-time data of the notebook PC but also real-time audio/video data can be transmitted by wireless in all rooms of the home or office.

Additionally, the CardBus PC Card type wireless transmitting/receiving device according to the present invention has the advantages that it can easily be built in a notebook PC, has a simple structure with a low cost, has a very high wireless transmission speed of 55 to 480 Mbps in comparison to the existing IEEE 802.11b type wireless 1394 bridge device in the form of an external IEEE 1394 adapter, and guarantees the QoS using the IEEE802.15.3 type MAC to provide a high-quality service to the users.

While the pure wireless transmitter using the TRS network according to the present invention has been described and illustrated herein with reference to the preferred embodiment thereof, it will be understood by those skilled in the art that various changes and modifications may be made to the invention without departing from the spirit and scope of the invention, which is defined in the appended claims.

What is claimed is:

1. A CardBus PC Card type wireless transmitting/receiving device that performs a wireless data transmission/reception operation between a plurality of notebook PCs (Personal Computers) and an MB-OFDM (Multiband Orthogonal Frequency Division Multiplexing) UWB (Ultra Wide Band) type piconet coordinator, the device comprising:

a wireless 1394 device, built in the notebook PC in the form of a CardBus PC Card, for converting a CardBus PC Card access signal of the notebook PC into an MB-OFDM UWB signal to transmit the converted MB-OFDM UWB signal, and inversely converting a received MB-OFDM UWB signal into a CardBus PC Card access signal of the notebook PC, the wireless 1394 device comprising:

a CardBus PC Card connection unit connected to the notebook PC through a CardBus PC Card interface a DMA control unit;

a buffer connection unit configured to receive and convert an output from the DMA control unit into a transmission FIFO (First-In First-Out) signal;

a transmission FIFO unit configured to receive the transmission FIFO signal from the buffer connection unit and output 1394 sub-action transmission data;

a reception FIFO unit configured to receive and temporarily store 1394 sub-action reception data into a reception FIFO signal, and transfer the reception FIFO signal to the buffer connection unit;

a PAL unit configured to receive the 1394 sub-action transmission data from the transmission FIFO unit;

a MAC unit configured to receive the PAL data from the PAL unit;

an MB-OFDM UWB transmission/reception unit configured to receive the MAC data from the MAC unit; and a wireless 1394 device control unit for controlling and managing the CardBus PC Card connection unit using a CardBus PC Card connection unit control signal.

2. The device as claimed in claim 1, wherein the MB-OFDM UWB signal is a signal that provides a transmission speed of 55 to 480 Mbps in a band of 3.1 to 10.6 GHz.

3. The device as claimed in claim 1:

wherein the CardBus PC Card connection unit is configured to convert the CardBus PC Card access signal into a DMA (Direct Memory Access) control signal or a CardBus PC Card connection unit control signal;

wherein the DMA control unit is configured to receive the DMA control signal from the CardBus PC Card connection unit, transfer non-real-time data in a host memory of the notebook PC and real-time audio/video data, and if a buffer connection signal is received, transfer the non-real-time data and the real-time audio/video data to the CardBus PC Card connection unit;

wherein the buffer connection unit is configured to convert the reception FIFO signal into a buffer connection signal to transfer the buffer connection signal to the DMA control unit if a reception FIFO signal is received;

wherein the transmission FIFO unit is further configured to temporarily store and convert the non-real-time data of the notebook PC and the real-time audio/video data into 1394 sub-action transmission data;

wherein the PAL unit is further configured to:

encapsulate the data to produce PAL data in the form of an IEEE 802.15.3 MSDU (MAC Service Data Unit) frame, if PAL data in the form of an IEEE 802.15.3 MSDU frame is received;

decapsulate the PAL data to produce 1304 sub-action reception data, a protocol ID and a PAL header, transfer the 1394 sub-action reception data to the reception FIFO unit, and to simultaneously transfer the protocol ID and the PAL header, if PAL data in the form of an IEEE 802.15.3 MSDU frame is received;

wherein the MAC unit is further configured to:

convert the PAL data into MAC data in the form of an IEEE 802.15.3 MPDU (MAC Protocol Data Unit) frame, if a MAC unit control signal is received;

convert the MAC data into PAL data to transfer the PAL data to the PAL unit, if the MAC data is in the form of the IEEE 802.15.3 MPDU frame;

wherein the MB-OFDM UWB transmission/reception unit is further configured to:

convert the MB-OFDM UWB transmission/reception unit control signal into an MB-OFDM UWB signal to transfer the MB-OFDM UWB signal to an antenna, if an MB-OFDM UWB transmission/reception unit control signal is received; and convert the MB-OFDM UWB signal into MAC data to transfer the MAC data to the MAC unit, if an MB-OFDM UWB signal is received from another wireless 1394 device; and wherein the wireless 1394 device control unit is configured to:

control and manage the DMA control unit using a DMA control unit control signal;

control and manage the buffer connection unit using a buffer connection unit control signal;

control and manage the PAL unit using an IEEE 802.15.3 PAL unit control signal;

control and manage the MAC unit using an IEEE 802.15.3 MAC control signal; and control and manage the MB-OFDM UWB transmission/reception unit using an MB-OFDM UWB transmission/reception unit control signal.

4. The device as claimed in claim 1, wherein in the CardBus PC Card connection access signal composed of a multiplexed CardBus PC Card address, data, a CardBus PC Card control signal and a CardBus PC Card status signal, the CardBus PC Card connection unit converts the multiplexed CardBus PC Card address and the data into the DMA control signal to transfer the DMA control signal to the DMA control unit, and converts the CardBus PC Card control signal and the CardBus PC Card status signal into the CardBus PC Card connection unit control signal to transfer the CardBus PC Card connection unit control signal to the wireless 1394 control unit.

5. The device as claimed in claim 3, wherein the IEEE 802.15.3 MSDU frame has a structure composed of:

a protocol ID field in which protocol ID information is stored;

a PAL header field in which PAL header information is stored; and a 1394 sub-action data field in which 1394 sub-action data is stored.

6. The device as claimed in claim 1, wherein the MAC unit transmits command data and non-real-time data by a CSMA/CA (Carrier Sense Multiple Access with Collision Avoidance) method in a selective CAP (Contention Access Period) of an IEEE 802.15.3 piconet superframe so that various CardBus PC Card type wireless 1394 devices can share a single wireless channel, and transmits management data, command data, non-real-time data and real-time audio/video data by a TDMA (Time Division Multiple Access) method in a basic CTAP (Channel Time Allocation Period).

7. The device as claimed in claim 6, wherein the OEEE 802.15.3 piconet superframe has a structure composed a beacon, a contention access period and a channel time allocation period.

8. The device as claimed in claim 6, wherein the IEEE 802.15.3 piconet superframe has a structure composes of an LLC field, a SNAP field, a PAL header field and a sub-action data field.

9. The device as claimed in claim 3, wherein the PAL unit comprises:

an encapsulation unit for receiving 1394 sub-action transmission data from the transmission FIFO unit, and if the protocol ID and the PAL header corresponding to the IEEE 802.15.3 PAL unit control signal are received from the wireless 1394 device control unit, performing an encapsulation of the 1394 sub-action transmission data to produce PAL data, and transferring the PAL data to the MAC unit; and a decapsulation unit for performing a decapsulation of the PAL signal to produce the 1394 sub-action reception data, the protocol ID and the PAL header if the PAL signal is received from the MAC unit, transferring the 1394 sub-action reception data to the reception FIFO, and transferring the protocol ID and the PAL header corresponding to the IEEE 802.15.3 PAL unit control signal to the wireless 1394 device control unit.

10. The device as claimed in claim 9, wherein the encapsulation unit further includes functions of cycle time distribution and synchronization, search for devices and services, real-time resource allocation and real-time connection management so as to support an IEEE 1394 application service.

11. The device as claimed in claim 3, wherein the MAC unit comprises:

a transmission memory for receiving the PAL data from the PAL unit, if the MAC header corresponding to the IEEE 802.15.3 MAC unit control signal is received from the wireless 1394 device control unit, temporarily storing and combining the MAC header with the IEEE 802.15.3 MSDU frame, and converting the combined data into transmission memory data in the unit of 32 bits;

a transmission queue for receiving and temporarily storing the transmission memory data in the unit of 32 bits from the transmission memory, and converting the transmission memory data into transmission queue data in the unit of 32 bits according to a transmission queue control signal;

a protocol control unit for receiving and converting the non-real-time data corresponding to the transmission queue data in the unit of 32 bits and the real-time audio/video data from the transmission queue into protocol control unit transmission data in the unit of 8 bits, receiving and converting management data corresponding to the IEEE 802.15.3 MAC unit control signal and command data from the wireless 1394 device control unit into protocol control unit transmission data in the unit of 8 bits to transfer the protocol control unit transmission data to the MAC transmission unit, receiving protocol control unit reception data in the unit of 8 bits and converting the non-real-time data and the real-time audio/video data into reception queue data in the unit of 32 bits to transfer the reception queue data along with a reception queue control signal, and converting the management data and the command data into an IEEE 802.15.3 MAC unit control signal to transfer the IEEE 802.15.3 MAC unit control signal to the wireless 1394 device control unit;

a MAC transmission unit for receiving the protocol control unit transmission data in the unit of 8 bits from the protocol control unit, creating a MAC trailer of 4-byte FCS (Frame Check Sequence), and converting the MAC trailer into MAC data in the form of an IEEE 802.15.3 MPDU frame;

a MAC reception unit for receiving the MAC data from the MB-OFDM UWB transmission/reception unit, performing functions of frame address discrimination, duplicated frame detection, and FCS check, converting the MAC data into the protocol control unit reception data in the unit of 8 bits by removing the MAC trailer, and transferring the protocol control unit reception data to the protocol control unit;

a reception queue for receiving and temporarily storing the reception queue data in the unit of 32 bits from the protocol control unit, and converting the reception queue data into reception memory data in the unit of 32 bits according to the reception queue control signal from the protocol control unit; and a reception memory for receiving and temporarily storing the reception memory data in the unit of 32 bits, separating the reception memory data into an IEEE 802.15.3 MSDU frame and a MAC header, converting the IEEE 802.15.3 MSDU frame into PAL data to transfer the PAL data to the PAL unit, and transferring the MAC header corresponding to the IEEE 802.15.3 MAC unit control signal to the wireless 1394 device control unit.

12. The device as claimed in claim 11, wherein the protocol control unit further includes a function of performing a piconet synchronization with other MB-OFDM UWB devices.

13. The device as claimed in claim 3, wherein the MB-OFDM UWB transmission/reception unit comprises:

an MB-OFDM UWB transmission unit for receiving the MAC data from the MAC unit, and if MB-OFDM UWB transmission/reception unit control signal is received from the wireless 1394 device control unit, converting the MAC data into an MB-OFDM UWB signal to transfer the MB-OFDM UWB signal to the antenna; and an MB-OFDM UWB reception unit for receiving and inversely converting the MB-OFDM UWB signal of another wireless 1394 device from the antenna into MAC data to transfer the MAC data to the MAC unit.

14. The device as claimed in claim 13, wherein the MB-OFDM UWB transmission unit comprises:

a PLCP (Physical Layer Convergence Procedure) processor for receiving the MAC data in the form of the IEEE 802.15.3 MPDU frame from the MAC unit, and if the MB-OFDM UWB transmission/reception unit control signal is received from the wireless 1394 device control unit, converting the received signal into PLCP-processed data in the form of an MB-OFDM UWB PPDU (PHY Protocol Data Unit) frame;

a scrambler for receiving and converting the PLCP-processed data from the PLCP processor into a random code sequence to transfer scrambled data;

a convolutional encoder for receiving the scrambled data from the scrambler, and performing an convolutional encoding of the scrambled data to transfer the convolutionally encoded data;

a puncturer for receiving the convolutionally encoded data from the convolutional encoder, and if transmission speed data corresponding to the MB-OFDM UWB transmission/reception unit control signal is received from the wireless 1394 device control unit, performing a puncturing function for heightening a code rate by regularly omitting a part of the convolutionally encoded data to match the transmission speed to transfer punctured data;

an interleaver for receiving the punctured data from the puncturer, performing a bit-interleaving function for rearranging the order of symbol columns and data columns in a predetermined unit so as to normally correcting burst errors produced due to instantaneous noises to transfer the interleaved data;

a modulator for receiving the interleaved data from the interleaver, and performing a QPSK (Quadrature Phase Shift Keying) modulation of the interleaved data to transfer the modulated data;

a serial-parallel conversion unit for receiving and converting the serial modulated data from the modulator into parallel data to transfer the parallel data;

an IFFT (Inverse Fast Fourier Transform) unit for receiving and performing an IFFT of the parallel data from the serial-parallel conversion unit to transfer the IFFT-transformed data;

a DAC (Digital-Analog Conversion) unit for receiving and converting the IFFT-transformed data from the IFFT unit into an analog signal to transfer the analog signal; and an RF transmission unit for receiving and performing an RF modulation of the analog signal from the DAC unit, converting the modulated signal into an MB-OFDM UWB signal to transfer the MB-OFDM UWB signal to the antenna.

15. The device as claimed in claim 13, wherein the MB-OFDM UWB PPDU frame has a structure composed of a PHY header field, an IEEE 802.15.3 MPDU frame field and a PHY trailer field.

16. The device as claimed in claim 13, wherein the MB-OFDM UWB reception unit comprises:

an RF reception unit for receiving an MB-OFDM UWB signal from another wireless 1394 device through the antenna, and RF-modulating the MB-OFDM UWB signal into a baseband analog signal to transfer the baseband analog signal;

an ADC (Analog-Digital Conversion) unit for receiving and converting the analog signal from the RF reception unit into digital data to transfer the digital data, and converting RSSI (Received Signal Strength Indicator) data into an MB-OFDM UWB transmission/reception unit control signal to transfer the MB-OFDM UWB transmission/reception unit control signal to the wireless 1394 device control unit;

an FFT (Fast Fourier Transform) unit for receiving and performing an FFT transform of the digital data from the ADC unit to transfer the FFT-transformed data;

a parallel-serial conversion unit for receiving and converting the parallel FFT-transformed data from the FFT unit into serial data to transfer the serial data;

an equalizer for receiving the serial data from the parallel-serial conversion unit, performing an equalization of the data to compensate for a signal distortion due to a transmission channel to transfer the equalized data;

a demodulator for receiving and performing a QPSK demodulation of the equalized data from the equalizer to transfer the demodulated data;

a deinterleaver for receiving and performing a bit-deinterleaving of the demodulated data to normally correct the burst errors to transfer the deinterleaved data;

a depuncturer for receiving and depuncturing the deinterleaved data from the deinterleaver to restore the part of the data regularly omitted by the puncturer to transfer the depunctured data;

a viterbi decoder for receiving and viterbi-decoding the depunctured data from the depuncturer to transfer the viterbi-decoded data; and a descrambler for receiving and descrambling the viterbi-decoded data from the viterbi decoder to create the original data from the random code sequence made by the scrambler, and converting the descrambled data into MAC data to transfer the MAC data to the MAC unit.

17. The device as claimed in claim 1, wherein the protocol stack of the wireless 1394 device has a structure composed of an application layer, an IEEE 802.15.3 1394 PAL protocol layer, an IEEE 802.15.3 MAC protocol layer and an IEEE 802.15.3a UWB PHY protocol layer.

* * * * *